June 25, 1957     G. W. MANN     2,796,770
MARINE TRANSMISSION

Filed Jan. 5, 1954     3 Sheets-Sheet 1

INVENTOR.
GEORGE W. MANN,
BY
McMorrow, Berman & Davidson
ATTORNEYS.

INVENTOR.
GEORGE W. MANN,
BY
McMorrow, Berman + Davidson
ATTORNEYS.

INVENTOR.
GEORGE W. MANN,
BY
McMorrow, Berman + Davidson
ATTORNEYS.

2,796,770

MARINE TRANSMISSION

George W. Mann, Orlando, Fla.

Application January 5, 1954, Serial No. 402,221

2 Claims. (Cl. 74—202)

This invention relates to transmissions, and more particularly to an improved friction drive transmission for small boats.

A main object of the invention is to provide a novel and improved marine transmission particularly adaptable for use with small boats, combining the functions of a clutch, reverse gear, reduction gear and universal joint, the improved transmission being simple in construction, being easy to install, and being easy to operate.

A further object of the invention is to provide an improved marine friction drive transmission which involves inexpensive components, which is durable in construction, and which requires no special means to maintain the elements thereof in driving relationship, the thrust developed by the reaction on the propeller shaft being utilized for this purpose.

Further objects and advantages of the invention will become apparent from the following description and claims, and from the accompanying drawings, wherein:

Figure 1:
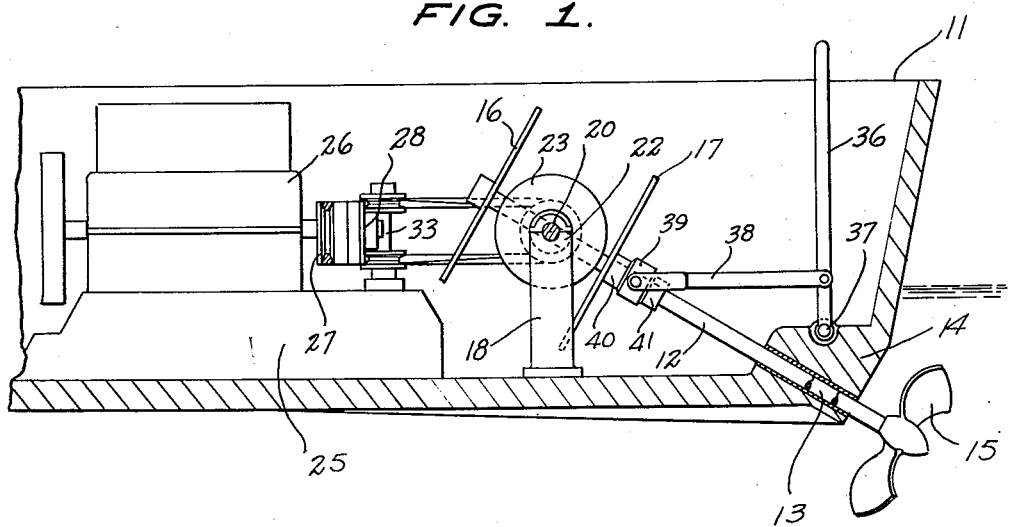
Figure 1 is a longitudinal vertical cross sectional view taken through the rear portion of a small boat provided with an improved friction drive transmission constructed in accordance with the present invention.
Figure 2:
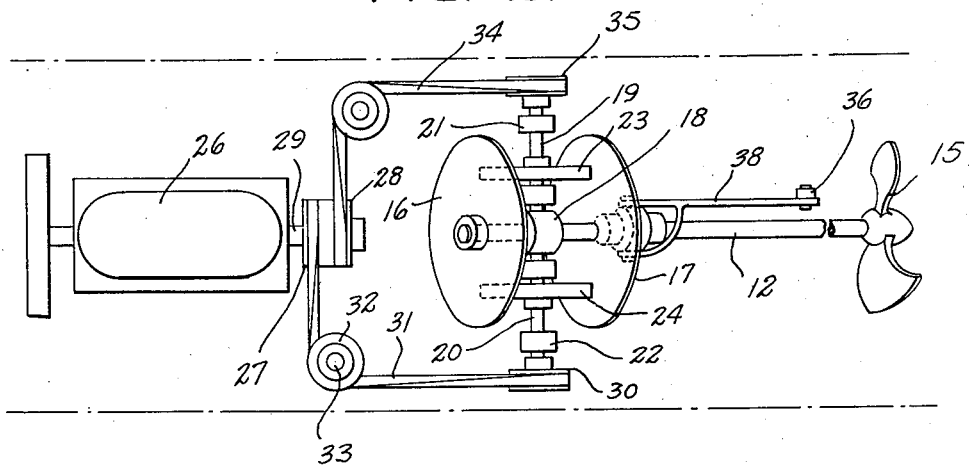
Figure 2 is a top plan view of the engine and the transmission elements employed in Figure 1.

Referring to the drawings, and more particularly to Figures 1 and 2, 11 designates the rear portion of a small boat of conventional construction, and 12 designates the propeller shaft of the boat, said shaft being rotatably and slidably supported in an inclined position in the rear of the boat, as by the bearing sleeve 13 secured in the rear bottom portion 14 of the boat. Secured to one end of the shaft 12 is the propeller 15. Secured to the upper end portion of the shaft 12 are the spaced circular friction discs 16 and 17. The upper portion of the propeller shaft 12 is rotatably and slidably supported in a bearing element 18, said bearing element being located between the discs 16 and 17 and being fixedly secured to the floor of the boat, as shown in Figure 1.

Designated at 19 and 20 are respective transversely aligned shafts which are rotatably supported in suitable stationary bearings 21 and 22 for rotation around a common transverse axis located between the friction discs 16 and 17. Designated at 23 and 24 are respective friction drive discs mounted on the shafts 19 and 20, said drive discs being smaller in diameter than the spacing between the friction discs 16 and 17. The discs 23 and 24, however, are equal in diameter and identical in shape.

Mounted on the floor of the boat, as on a suitable supporting pedestal 25 is the longitudinally arranged internal combustion engine 26 having the driving pulleys 27 and 28 mounted on its shaft 29. The driving pulley 27 is coupled to a pulley 30 secured on the shaft 20, as by a belt 31 extending around idler pulleys 32 secured on a vertical idler shaft 33 journaled on the pedestal 25. The pulley 28 is similarly coupled, as by a belt 34 to a pulley 35 secured on the end of shaft 19, the pulleys 30 and 35 being driven in respectively opposite directions, whereby the driving discs 24 and 23 rotate in respectively opposite directions.

Designated at 36 is a control lever pivoted at 37 to the lower rear portion of the boat. Lever 36 is connected by a yoke member 38 to a collar member 39 rotatably mounted on the shaft 12 and retained between respective thrust collars 40 and 41 secured on said shaft 12. By rotating the lever 36 in one direction, the friction disc 16 may be brought into engagement with the drive discs 23 and 24, thereby driving the propeller shaft in one direction, and by rotating the lever 36 in the opposite direction, the friction disc 17 may be brought into engagement with the driving discs 23 and 24, rotating the propeller shaft 12 in the opposite direction. When moved to drive the propeller shaft 12 for forward propulsion of the boat, the thrust developed by the propeller acts to maintain the driving discs 23 and 24 in driving relationship with the friction disc engaged, and thus holds the propeller shaft in a driven relationship with respect to the driving discs 23 and 24. For example, with the motor running, the operator rotates the lever 36 to move the propeller shaft 12 forward to bring the friction disc 17 into contact with the driving discs 23 and 24. This rotates the propeller shaft 12 and the propeller 15 to provide forward propulsion for the boat. The reaction thus produced on the propeller shaft provides a thrust on the disc 17 tending to hold the disc 17 in frictional engagement with the driving discs 23 and 24. To reverse the movement of the boat, the lever 36 is rotated rearwardly, causing the propeller shaft 12 to be moved rearwardly and bringing the driven friction disc 16 into frictional engagement with the driving discs 23 and 24. This reverses the direction of rotation of the propeller shaft 12 and of the propeller 15, producing a reverse thrust on the shaft acting to pull the shaft in a rearward direction, and thus acting to hold the friction disc 16 in frictional engagement with the driving discs 23 and 24. Therefore, no special locking means is required to maintain the frictionally engaging elements of the transmission in torque-transmitting relationship after they have been engaged.

Figure 3:
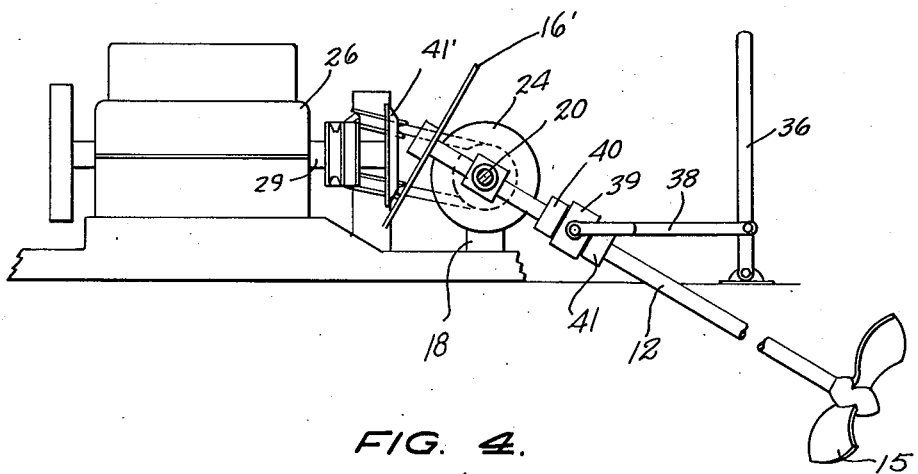
Figure 3 is a side elevational view of the engine and transmission element showing a modified form of transmission according to the present invention.
Figure 4:
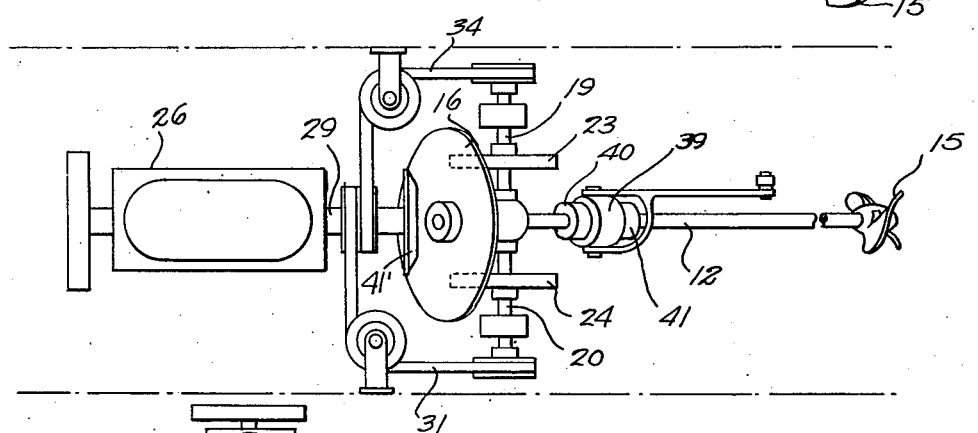
Figure 4 is a top plan view of the elements illustrated in Figure 3.

Referring now to the form of the invention shown in Figures 3 and 4, a single friction disc 16' is secured to the end of the propeller shaft 12. A beveled friction driving disc 41' is secured on the end of the engine shaft 29, the friction disc 16' being located between the beveled periphery of the driving disc 41' and the peripheries of the driving discs 23 and 24. As in the form of the invention illustrated in Figures 1 and 2, when the propeller shaft 12 is moved forwardly, said propeller shaft is driven to provide forward propulsion of the boat, the disc 16' being frictionally engaged with the beveled periphery of the disc 41', thus directly coupling the engine shaft 29 to the propeller shaft 12. As in the previously described embodiment of the invention, the thrust developed by forward propulsion acts to urge the propeller shaft 12 forwardly and to maintain the driven disc 16' in frictional engagement with the driving disc 41'. To reverse the direction of movement of the boat, the propeller shaft 12 is moved rearwardly, by means of the lever 36, in the same manner as in the previously described form of the invention, whereby the disc 16' is frictionally engaged with the driving discs 23 and 24. The reverse thrust developed on the propeller shaft 12 then acts to maintain the friction disc 16' in coupling relationship with the driving discs 23 and 24.

Figure 5:
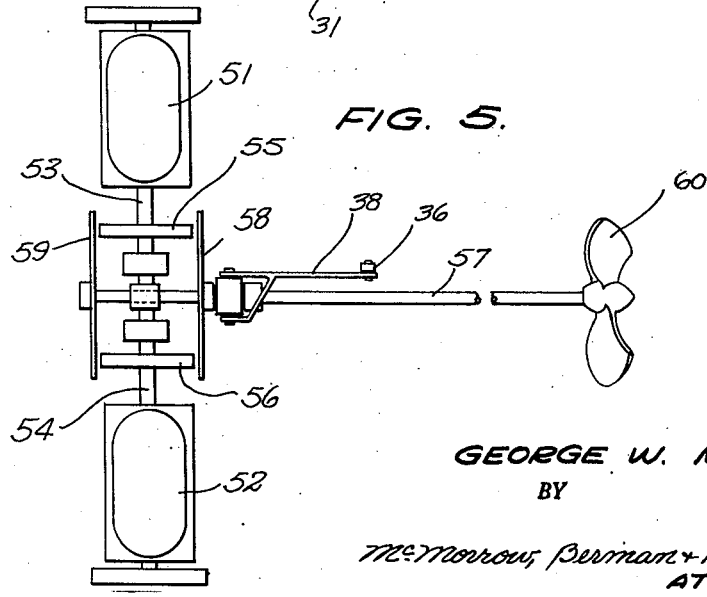
Figure 5 is a top plan diagrammatic view showing another modification of the improved transmission of the present invention, wherein two engines are employed, one on either side of the boat.
Figure 6:
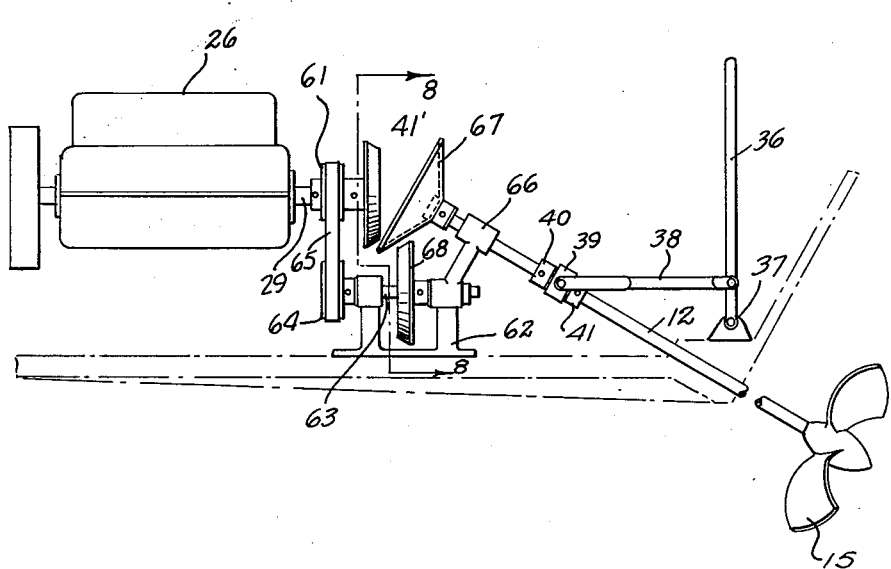
Figure 6 is a view similar to Figure 1, showing a still further modified form of transmission according to the present invention.

Referring now to the form of the invention illustrated in Figures 5 and 6, separate, transversely arranged internal combustion engines 51 and 52 are employed, the shaft of the engine 51 being shown at 53 and the shaft of the engine 52 being shown at 54. Secured on shaft 53 is the driving disc 55 and secured on shaft 54 is the driving disc 56. The propeller shaft, shown at 57, has secured thereon the respective friction discs 58 and 59 which are located on opposite sides of the driving discs 55 and 56, the discs 58 and 59 being spaced apart by a distance greater than the diameters of the driving discs 55 and 56. As in the previously described forms of the invention, the propeller shaft 57 is slidably and rotatably mounted and may be moved to bring either the disc 59 or the disc 58 into frictional coupling relationship with respect to the driving discs 55 and 56. The engines 51 and 52 are arranged so that their shafts 53 and 54 rotate in opposite directions. Thus, when the lever 36 is operated to move the shaft 57 forwardly, the driven disc 58 is brought into engagement with the driving discs 55 and 56, causing the shaft 57 to be rotated to produce forward propulsion. The reaction developed by the propeller 60 therefore acts to move the shaft 57 forwardly, and the thrust on said shaft tends to maintain the friction disc 58 in coupling friction relationship with respect to the driving discs 55 and 56. Similarly, when the lever 36 is rotated to move the propeller shaft 57 rearwardly, the reverse thrust developed by the propeller 60 acts to urge the friction disc 59 into frictional coupling relationship with the driving discs 55 and 56. Thus, as in the previously described forms of the invention, no special means is required to hold the transmission elements in engaging relationship after they have been once engaged by operating the lever 36.

Figure 7:
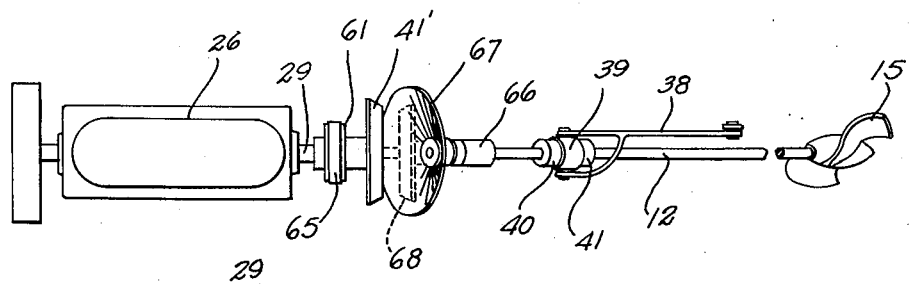
Figure 7 is a top plan view of the transmission of Fig. 6.
Figure 8:
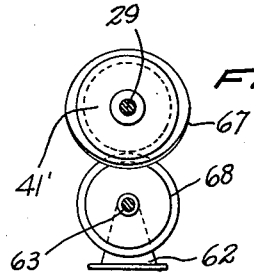
Figure 8 is a vertical transverse cross sectional view taken on line 8—8 of Figure 6.

Referring now to the form of the invention shown in Figures 6, 7 and 8, the motor shaft 29 has secured on its end the beveled driving disc 41' and has a pulley 61 secured thereon adjacent disc 41'. Journaled on bracket 62 is a shaft 63 located below and extending parallel to shaft 29. Secured on the forward end of shaft 63 is a pulley 64 which is drivingly coupled to pulley 61 by a belt 65.

Propeller shaft 12 is slidably journaled in a bearing element 66 formed integral with the rear portion of bearing bracket 62. Secured on the end of shaft 12 is a conical disc 67. Secured on shaft 63 is a beveled driving disc 68 which opposes driving disc 41'. The peripheral portion of conical disc 67 is disposed between the beveled peripheries of the opposing discs 41' and 68, as shown.

As in Figure 4, forward propulsion may be obtained by rotating lever 36 counterclockwise, as viewed in Figure 6, to engage the inside surface of conical disc 67 with the beveled periphery of disc 41'. Reverse propulsion may be obtained by rotating lever 36 clockwise to engage the outer surface of conical disc 67 with the beveled periphery of disc 68. As in the previously described forms of the invention, propeller reaction acts to maintain disc 67 in coupling engagement with either disc 41' or disc 68, depending on the direction of propulsion.

While certain specific embodiments of an improved marine transmission have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a marine transmission, a propeller shaft, means rotatably supporting said shaft for axial movement, a drive disc secured to said shaft, a driving shaft mounted at right angles to said propeller shaft, a driving disc secured on said driving shaft and being frictionally engageable with said drive disc, a second driving shaft at right angles to and coupled to the first driving shaft, said second driving shaft being located on the opposite side of the drive disc relative to the first-named driving disc, and a second driving disc on said second driving shaft, said second driving disc being drivingly engageable with said opposite side of the drive disc.

2. In a marine transmission, a propeller shaft, means rotatably supporting said shaft for axial movement, a drive disc secured to said shaft, a driving shaft mounted at right angles to said propeller shaft, a driving disc secured on said driving shaft and being frictionally engageable with said drive disc, a second driving shaft at right angles to and coupled to the first driving shaft, said second driving shaft being located on the opposite side of the drive disc relative to the first-named driving disc, a second driving disc on said second driving shaft, said second driving disc being drivingly engageable with said opposite side of the drive disc, means for selectively moving said propeller shaft axially in a direction to engage said drive disc either with said first-named driving disc or with said second-named driving disc, and means whereby said second driving disc rotates the propeller shaft in a direction opposite to the direction in which said propeller shaft is rotated by said first-named driving disc.

References Cited in the file of this patent
UNITED STATES PATENTS

| | | |
|---|---|---|
| 1,153,311 | Johnson | Sept. 14, 1915 |
| 2,179,626 | Hall | Nov. 14, 1939 |
| 2,682,853 | Petersen | July 6, 1954 |